US 6,603,660 B1

(12) United States Patent
Ehn et al.

(10) Patent No.: US 6,603,660 B1
(45) Date of Patent: Aug. 5, 2003

(54) REMOTE DISTRIBUTION FRAME

(75) Inventors: Michael W. Ehn, Dexter, MI (US); Todd Theisen, Grosse Ile, MI (US)

(73) Assignee: Netrix Technologies, Inc., Livonia, MI (US)

( * ) Notice: Subject to any disclaimer, the term of this patent is extended or adjusted under 35 U.S.C. 154(b) by 0 days.

(21) Appl. No.: 10/217,041

(22) Filed: Aug. 12, 2002

(51) Int. Cl.[7] .................................................. H05K 7/20
(52) U.S. Cl. ...................... 361/694; 361/695; 361/690; 361/724; 174/16.1; 312/223.2; 454/184
(58) Field of Search ................................. 361/600, 601, 361/641, 676–678, 687–690, 694, 695, 724; 174/16.1, 252; 312/223.1, 223.2; 454/184

(56) References Cited

U.S. PATENT DOCUMENTS

| 4,692,838 A | * | 9/1987 | Merchant ..................... 361/679 |
| 5,472,160 A | | 12/1995 | Burek et al. ................. 248/74.4 |
| 5,568,362 A | * | 10/1996 | Hansson ...................... 361/736 |
| 5,638,256 A | * | 6/1997 | Leach et al. ................. 361/641 |
| 5,696,864 A | | 12/1997 | Smith et al. ................. 385/135 |
| 5,732,180 A | | 3/1998 | Kaplan ........................ 385/135 |
| 5,886,300 A | | 3/1999 | Strickler ..................... 174/135 |
| 5,930,111 A | | 7/1999 | Yamazaki et al. ........... 361/690 |
| 5,933,563 A | | 8/1999 | Schaffer et al. ............. 385/135 |
| 6,330,152 B1 | * | 12/2001 | Vos et al. .................... 361/688 |
| 6,351,592 B1 | | 2/2002 | Ehn et al. .................... 385/135 |
| 6,396,990 B1 | | 5/2002 | Ehn et al. .................... 385/135 |
| 6,421,229 B1 | * | 7/2002 | Campbell et al. ........... 361/622 |
| 6,494,252 B1 | * | 12/2002 | Takala et al. .......... 165/104.33 |

* cited by examiner

Primary Examiner—Boris Chervinsky
(74) Attorney, Agent, or Firm—Young & Basile, PC

(57) ABSTRACT

A frame enclosure for use with electrical communication devices includes joined front and rear cabinets. Patch connectors are mounted in the front cabinet on a divider wall separating the front cabinet into separately accessible first and second compartments, each accessible through a separate, lockable door. External conductors pass through one side of the front cabinet and are terminated on one side of the electrical connectors in a patch field mounted on the divider wall. Conductors from electrical devices in the rear cabinet are engagable with the opposite end of the connectors in the other front compartment after passing through aligned apertures in the cabinet. Industry standard rack mounts are provided in the front and rear cabinets for mounting the electrical connectors and the electrical components in a vertically extending orientation to minimize overall cabinet depth. The rear cabinet has pivotal doors on opposite ends allowing access to the front and rear ends of each electrical device. An optional heat removal device is mounted on the rear cabinet for removing heat generated by the electrical devices.

14 Claims, 3 Drawing Sheets

REMOTE DISTRIBUTION FRAME

BACKGROUND

The present invention relates, in general, to communication equipment and, more specifically, to cabinets or racks for mounting communication equipment and connecting such equipment to external devices, cables, etc.

Such communication racks or frames are provided to house all communication equipment and connections for a given service area or drop zone in a user facility. The racks are typically floor mounted so as to provide easy access to the front and rear connections on various rack mounted components, such as hubs, switches, routers, etc. However, such floor mounted racks take up valuable floor space in what is, typically, crowded user facilities.

Such racks can be mounted in other out of the way locations, such as from the ceiling of the user facility. However, the typical component rack is bulky and does not provide a closable and lockable enclosure for protecting the components and connections in the rack as well as to prevent unauthorized access to the connections and components.

Thus, it would be desirable to provide a remote distribution frame or cabinet which overcomes the deficiencies of prior art communication equipment mounting and connection apparatus.

SUMMARY

The present invention is a remote distribution frame ideally suited for use with electrical devices, such as communication devices, which provides a distribution drop for communication signals.

In one aspect, the remote distribution frame is in the form of an enclosure formed of a front cabinet and a rear cabinet. The front cabinet has a back wall, opposed sidewalls and top and bottom walls extending from the back wall, the sidewalls and the top and bottom defining a front surface aperture. At least one and preferable two doors moveably close the front aperture in the front cabinet. The divider wall intermediate the sidewalls of the front cabinet extends between the back wall and the top and bottom walls to form separate front interior compartments in the front cabinet. At least one connector means is mounted in the divider wall for terminating electrical conductors passing into the front cabinet and conductors extending from electrical devices housed in the rear cabinet.

The rear cabinet includes sidewalls, a top wall and a bottom wall extending from a front wall. The rear cabinet is joined to the front cabinet at the juxtaposed back wall of the front cabinet and the front wall of the rear cabinet. An aperture is formed in the back wall of the front cabinet and the front wall of the rear cabinet to dispose electrical devices in the rear cabinet in electrical communication via conductors or cables with the connector means in the front cabinet. Support means are mounted in the rear cabinet adjacent the top and bottom walls of the rear cabinet for supporting rack mountable electrical devices in the rear cabinet.

In a preferred aspect of the invention, the support means includes first and second opposed rails, each having a plurality of spaced apertures disposed in an industry standard spacing. The apertures are alignable with apertures and mounting flanges on the electrical devices and receive fasteners for mounting the electrical devices to the rails in a vertical electrical device orientation.

Mounting rails are also carried on the divider wall in the front cabinet and include apertures alignable with apertures in the mounting flanges on the connector means. Preferably, the mounting means in the rear and front cabinets are substantially parallel.

In another aspect of the invention, a temperature control means is coupled to the rear cabinet for controlling the internal temperature of the rear cabinet. In a preferred aspect, the temperature control means is a heat removal means operative to remove heat from the interior of the rear cabinet.

The inventive remote distribution frame provides separately accessible termination and patch connections for external electrical conductors and internal conductors extending from active electrical components. The active electrical components are mounted in a separately accessible rear enclosure provided with an optional temperature control means.

Industry standard rack supports are mounted in the front and rear cabinet portions of the remote distribution frame in parallel with each other to orient the electrical connector patch field and the electrical components in a vertical orientation to minimize cabinet depth while improving component support.

BRIEF DESCRIPTION OF THE DRAWING

The various features, advantages and other uses of the present invention will become more apparent by referring to the following detailed description and drawing in which.

DETAILED DESCRIPTION

Figure 1:
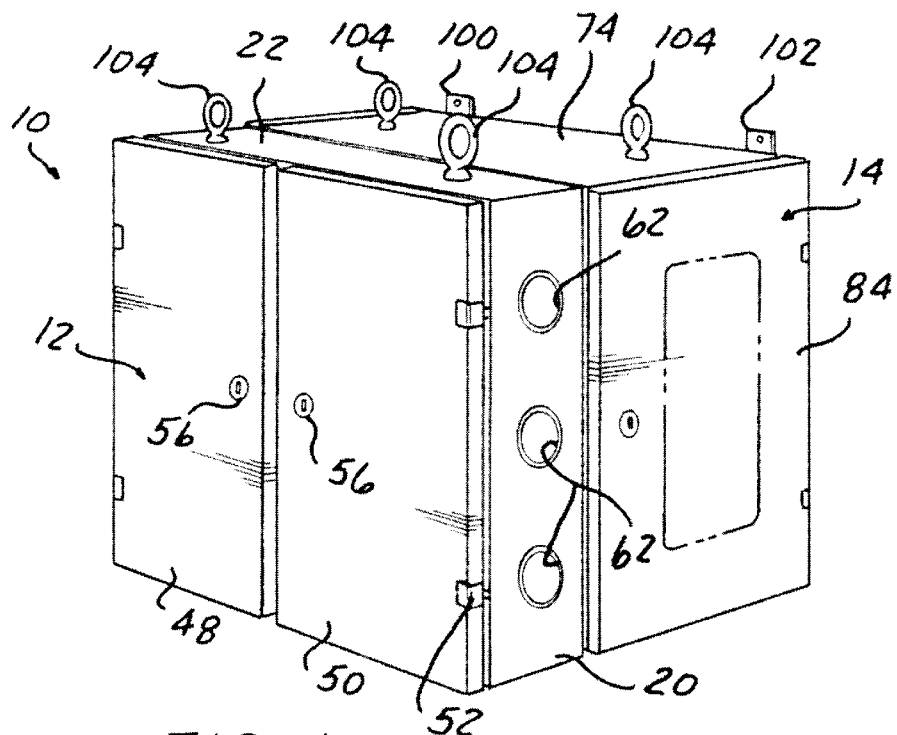
FIG. 1 is a perspective view of a remote distribution frame according to the present invention.

Referring now to the drawing, and to FIGS. 1–6 in particular, there is depicted a remote distribution frame 10 constructed in accordance with the teachings of the present invention. The remote distribution frame 10, also referred to as a remote distribution cabinet, provides zone communication for network components. The frame 10 is devised for overhead mounting, such as, for example, on the walls, beams, posts and trusses of a user facility.

According to the present invention, the remote distribution frame 10 is formed of joinable front and rear enclosures or cabinets 12 and 14, respectively. The front and rear cabinets 12 and 14 are of variable size to suit a range of communication applications with the depth of each front and rear cabinet 12 and 14 being provided in a plurality of different dimensions to hold one or multiple patch fields, rack mounted components, etc.

As used hereafter, EIA rack mounted communication equipment is nineteen inch wide equipment with standard mounting apertures for mounting in EIA standard racks. The size of such rack mounted equipment, according to the EIA standards, is designated 3U, 6U and 9U, with the 3U rack sized to receive one patch field or one rack mounted component. The 6U and 9U sized rack spaces receive two adjacent patch fields and components or three patch fields and components, respectively.

As used herein, the terms "left side" and "right side", as well as other dimensional terms including "top, bottom, front, and rear" will be referenced from a position looking directly at the exterior surface of the front cabinet 12 as shown in FIG. 1.

The front cabinet 12 is formed of a single metal housing, preferably a fourteen gauge powder coated steel. The front cabinet 12 includes a left sidewall 18, an opposed right sidewall 20, a top wall 22 and a bottom wall 24.

By example only, the top wall 22, the bottom wall 24 and a back wall 26 are integrally formed as a one piece, bent metal sheet with edge mounting flanges being formed on the ends of the top and bottom walls 22 and 24 to receive pivotal doors, as described hereafter. The sidewalls 18 and 20 are joined to the top wall 22, the bottom wall 24 and the back wall 26 by welds to form the front cabinet 12 into a sealed enclosure.

Figure 2:
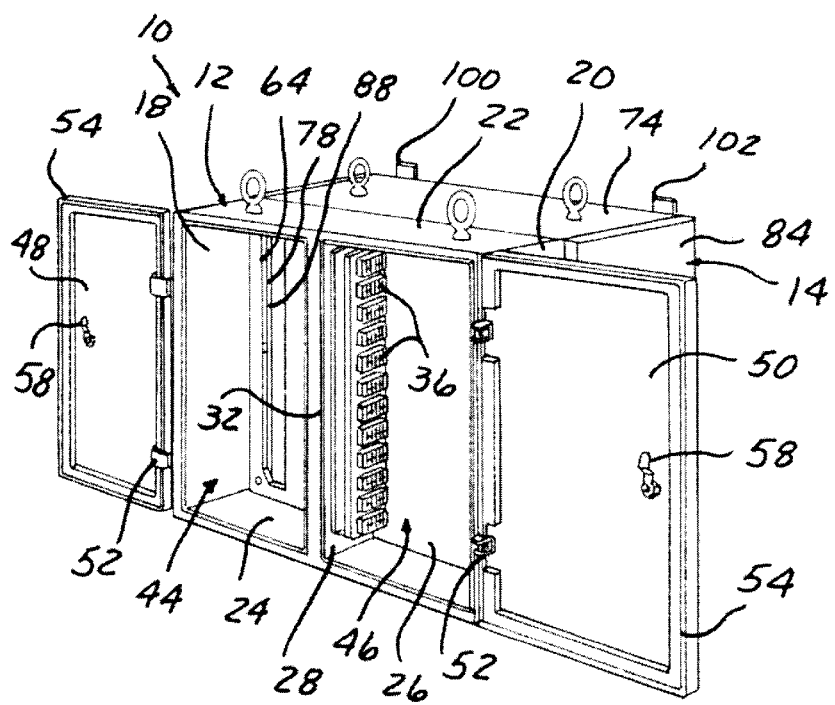
FIG. 2 is a perspective view of the remote distribution frame depicted in FIG. 1, with both front cabinet doors deployed in an open position.
Figure 3:
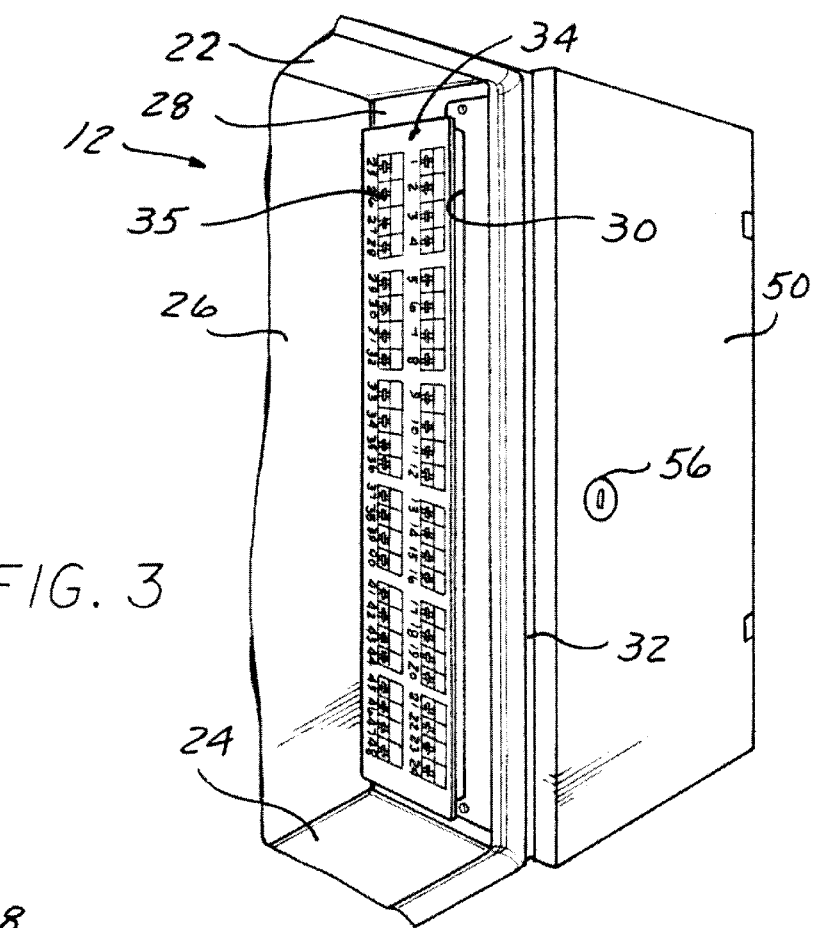
FIG. 3 is an enlarged, perspective view of the left side of the patch field mounted on the divider wall between the two front cabinet sections.
Figure 4:
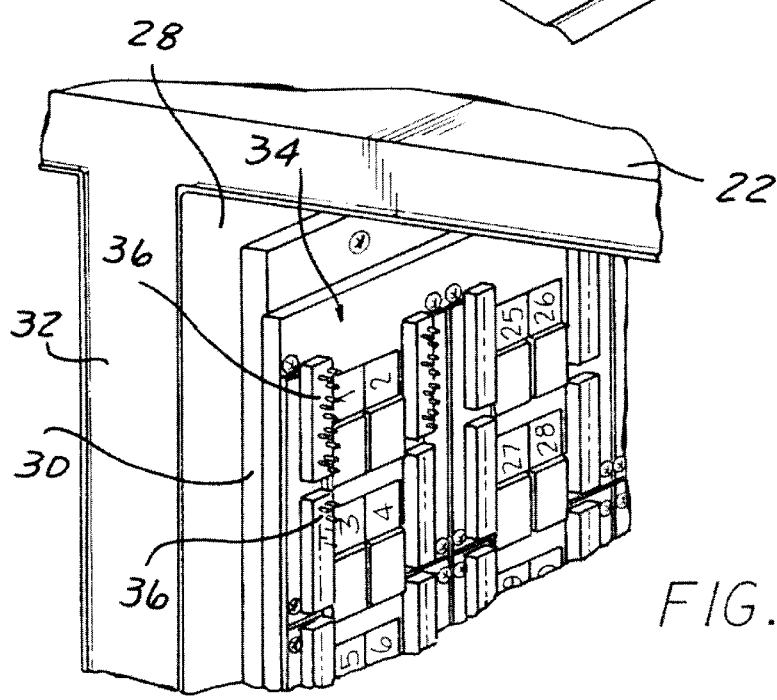
FIG. 4 is a partial enlarged, perspective view of the opposite or right side of the patch field shown in FIG. 3.
Figure 6:
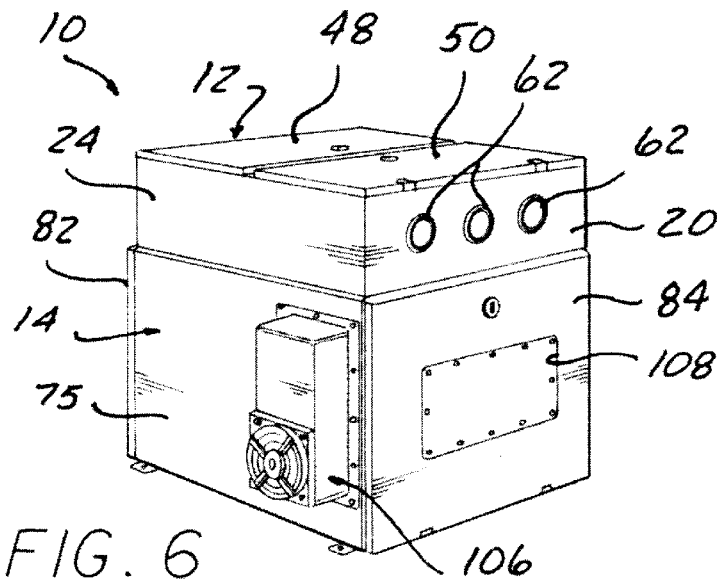
FIG. 6 is a right hand bottom, perspective view of the remote distribution frame shown in FIG. I depicting the optional temperature control unit.

As shown in FIGS. 2–4, a central, intermediate divider wall 28 is mounted vertically between the top and bottom walls 22 and 24 and the back wall 26 and secured thereto by means of welds. A generally polygonal aperture 30 is formed in the divider wall 28 to receive various connection devices, as described hereafter. An end flange 32 is disposed adjacent one end of the divider wall 28, generally in line with the front edges of the top and bottom walls 22 and 24 and joined to at least the top and bottom walls 22 and 24 by welds to define a central wall on the front of the front cabinet 12.

The width or depth of the divider wall 28 and the width of the aperture 30 is sized to receive one, two, three, communication devices, etc., to fit the 3U, 6U and 9U EIA standard sizes. As described above, the width of the divider wall 28 may be sized to receive one, two, or three connector devices, such as the single connector device 34 shown in FIG. 3 and described in greater detail hereafter. By example only, the patch field or connector device 34 is a Netrix Technologies, Inc., rack mounted patch panel, Model No. N-48B110. By example only, the patch field, as shown in FIG. 3, includes a plurality of standard RJ45 jacks 35 for receiving mating plugs, not shown, on the ends of cables extending from active components, such as hubs, switches, routers, etc., mounted in the rear cabinet 14.

The opposite surface of the patch field 34, as shown in FIG. 4, provides a plurality of wire connectors 36 associated with each of the plug receptacles 35 on the opposite side of the patch field connector 34.

The divider wall 28 includes apertures formed in the opposite ends of the aperture 30 for forming mounting rails which receive fasteners to attach the mounting flanges on the patch field connector 34 to the divider wall 28 in the same manner as the rack mounted patch field connectors 34 are mounted in a standard EIA rack.

Although one single large door could be mounted on the front cabinet 12 to enclose the interior compartments 44 and 46 formed within the interior of the front cabinet 12 by the divider wall 28, both also referred to as the left compartment 44 and the right compartment 46, in a preferred aspect of the invention, a first or left hand door 48 and a second or right hand door 50 are pivotally mounted by hinges 52 to the outer edges of the sidewalls 18 and 20. Each door 48 and 50 is sealingly engagable with the mounting flanges on the ends of the sidewalls 18 and 20 and the top and bottom walls 22 and 24. A seal 54 may be carried on each door 48 and 50 to sealing engage each door 48 and 50 with the mounting flanges on the front cabinet 12 as shown in FIG. 2.

Each door 48 and 50 is provided with a separate lock mechanism, such as key operated lock 56, which pivots a lock member 58 shown in FIG. 2 into and out of engagement with the rear surface of the center trim member 32 to lock each door 48 and 50 in a closed position over the respective interior compartment 44 and 46.

The use of the two doors 48 and 50 provide separate sealable access to the interior compartments 44 and 46. If the key locks 56 are keyed differently, the separate keyed doors 48 and 50 may thus only be accessed by different authorized individuals. The right door 50 and the right side compartment 48 in the front cabinet 12 is a so-called termination compartment or side for receiving and terminating external conductors or cables to the connectors 36 in the patch field 34. To accomplish this, at least one and preferably a plurality of knockouts 62 are formed in the sidewall 20 to receive conductors, typically mounted in a conduit. The individual conductors extending through the knockouts 62 may then be connected or terminated in the appropriate connectors 36.

One or more knockouts may also be provided on the opposite sidewall 18 to provide external access for the passage of additional cables or conductors as necessary for a particular application.

The left compartment 44 in the front cabinet 12 provides patch side terminations from the active components mounted in the rear cabinet 12. Conductors or cables extending from the active components in the rear compartment 14 pass through an aperture 64 in the rear wall 26 of the front cabinet 12 located within the left compartment 44. The aperture 64 located in the left compartment 44 may be any size or shape to accommodate the particular number of conductors or cables used in a particular application.

The rear cabinet 14 is preferably constructed as a metal enclosure having opposed sidewalls 70 and 72, a top wall 74, a bottom wall, 75, a back or outer wall 76 and a front or inner wall 78. The sidewalls 70 and 72, as shown in FIG. 5, are formed with a central aperture surrounded by a mounting flange 80 which is adapted to sealingly engate separate left and right rear doors 82 and 84 which are pivotally attached by hinges 86 to the respective sidewalls 70 and 72.

Figure 5:
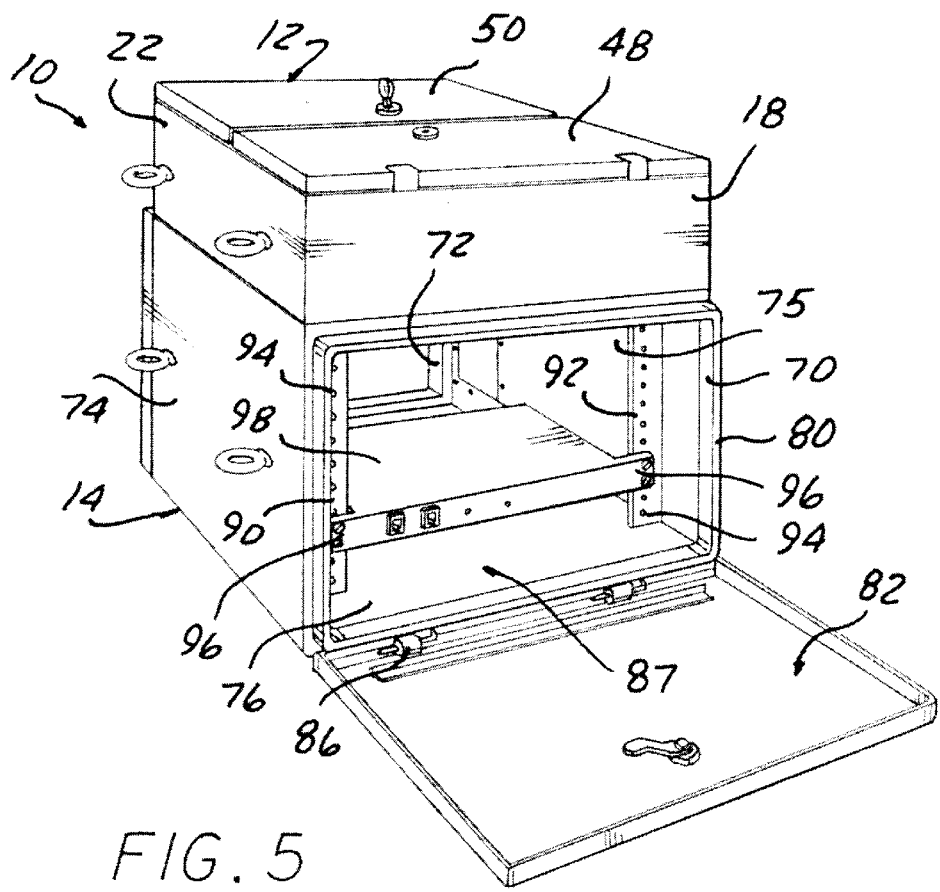
FIG. 5 is a left hand perspective view of the rear cabinet of the remote distribution frame shown in FIG. 1, with the right hand rear cabinet door deployed in an open position to show the component mounting racks.

The sidewalls 70 and 72, the top wall 74, the bottom wall 75, the back wall 76 and the front wall 78 may be formed by any suitable manufacturing process as a plurality of separate pieces or as several walls formed of bent sections of a single piece and joined together by welds to form the rear interior cabinet 12 which defines a rear compartment 87 shown generally in FIG. 5. p The front wall 78 of the rear compartment 14 is fixedly joined to the back wall 26 of the front compartment 12 by suitable means. Although welding is a preferred joining technique, other mounting methods, such as fasteners, may be employed to join the front cabinet 12 to the rear cabinet 14 at the juxta positioned back wall 26 and the front wall 78.

As shown in FIG. 2, an aperture 88 in the front wall 78 is aligned with the aperture 64 in the rear wall 26 of the front cabinet 12 to provide for the pass through of conductors and cables between the rear cabinet 14 and the front cabinet 12.

As shown in FIG. 5, EIA standard rails 90 and 92 form component mounting means in the rear cabinet 14. The rails 90 and 92 are typically bent metal sections which are fixedly secured, such as by welding by way of example only, to the inner surfaces of the top and bottom walls 74 and 75 and/or the front wall 78 and the back wall 76 of the rear cabinet 14. The rails 90 and 92 are generally parallel to the mounting rails in the divider wall 28 in the front cabinet 12.

Each rail 90 and 92 has a plurality of apertures 94 which are disposed in a predetermined EIA standard spacing to be alignable with apertures in mounting flanges 96 on communication equipment, an example of which is shown by reference number 98 in FIG. 5 and pictorially depicts a typical router, communication switch, hub, etc. Apertures in the mounting flanges 96 are alignable with selected apertures 94 in the mounting rails 90 and 92 to position the component 98 in a selected position within the rear cabinet 12. It should be noted that the apertures 94 in the rails 90 and 92 extend in a horizontal orientation in the normal mounting position of the frame 10 so as to mount the component 98 in a vertical position with the mounting flanges 96 on the component 98 located adjacent the top wall 74 and the bottom wall 75 in the rear cabinet 14. This vertical mounting position serves several functions. First, the vertical oriented support of the component 98 minimizes weight requirements on the rails 90 and 92 since the component 98 is essentially suspended from the top most rail 90. More importantly, the vertical orientation of the standard nineteen inch wide component(s) 98 reduces the depth of the rear cabinet 12 measured between the front wall 78 and the back wall 76 since the active components 98, etc., are mounted vertically within the rear cabinet 12 in a side-by-side manner.

The connections or cables extending from each of the components 98 are located in close proximity to the apertures 78 and 88 in the front and rear cabinets 12 and 14 to allow easy, passage of the conductors or cables through the apertures 78 and 88 to the termination jacks or connectors 35 on the patch field 34 in the front cabinet 12. Any connections to the rear end of each component 98 which would be located adjacent the right door 84 may be easily accessed by opening the right door 84, making the necessary connections to the components 98 and then directing the conductors, bundle of conductors or cables toward the opposite door 82 for passage through the aligned apertures 78 and 88 in the front and rear cabinets 12 and 14 to the termination connectors 35 in the patch field 34 in the front cabinet 12.

The remote distribution frame 10 may be mounted in a variety of different ways to accommodate different applications. The preferred mounting arrangement utilizes mounting straps 100 and 102 secured, such as by welding, to the back wall 76 of the rear cabinet 14. The straps 100 and 102 have apertures to receive suitable mounting fasteners to secure the remote distribution frame 10 to a building wall, truss, etc. As an alternate to or in addition to the mounting straps 100, a plurality of eye bolts 104 are secured, such by welding or by mechanical fasteners, through the top walls 22 and 74 of the front and rear cabinets 12 and 14. The eye bolts 104 can receive a chain, not shown, which is securable to a building truss, etc., for hanging the frame 10 above the facility floor thereby providing easy cable drops to the communication equipment located on the facility floor. This enables the frame 10 to service a large area of communication equipment without consuming valuable floor space.

The remote distribution frame 10 is optionally provided with one or more temperature control means or units. 106 as shown in FIG. 5. The unit 106 is mounted in one of two locations, such as on the bottom wall 75 of the rear cabinet 14 or through a knockout panel 108 on the right hand door 84 of the rear cabinet 14. Separate units 106 may be mounted in both locations for increased cooling capacity.

The temperature control unit 106 is, by example only, a heat removal means, such as a heat pipe based, cooling unit which is capable of removing excess heat from the active components 98 and maintains the compartment 86 in the rear cabinet 14 at near ambient temperature. This closed-loop unit 106 is more efficient than typical air conditioners as it removes excess heat as opposed to refrigerating an enclosure. This enables power consumption to be significantly reduced as well as eliminating condensation problems on or in the rear cabinet 14.

In summary, there has been disclosed a unique remote distribution frame suitable for conveniently mounting and locating active communication equipment or components and providing termination and patch field connections to such components for a large area drop application. The remote distribution frame includes separate front and rear cabinets, the front cabinet for passive connections or terminations and the rear cabinet for the active components. The patch field connectors and the active components are mounted vertically within the front and rear cabinets to reduce the width of the overall remote distribution frame. An optional temperature control means is provided for the rear cabinet to remove heat from the rear cabinet housing the active components.

What is claimed is:

1. An enclosure for electrical devices connectable to external conductors, the enclosure comprising:
   a front cabinet having a back wall, opposed sidewalls and top and bottom walls extending from the back wall, the sidewalls, and the top and bottom walls defining a front surface aperture;
   at least one door movably closing the front aperture in the front cabinet;
   a divider wall intermediate the sidewalls and extending between the back wall and the top and bottom walls in the front cabinet;
   connector means, mounted in the divider wall, for interconnecting external conductors passing into the front cabinet and conductors extending from electrical devices;
   a rear cabinet, the rear cabined joined to the front cabinet, the rear cabinet including sidewalls, a top wall and a bottom wall extending from a front wall;
   the back wall of the front cabinet juxtaposed with the front wall of the rear cabinet;
   an aperture formed in the back wall of the front cabinet and the front wall of the rear cabinet to dispose electrical devices in the rear cabinet in electrical communication with the connector means in the front cabinet; and
   support means mounted in the rear cabinet adjacent the top and bottom walls of the rear cabinet, for supporting rack mountable electrical devices in the rear cabinet.

2. The enclosure of claim 1 wherein the support means comprises:
   first and second opposed rails, each having a plurality of spaced apertures, the apertures adapted for alignment with apertures on mounting flanges carried on the electrical devices and receiving fasteners for mounting the electrical devices on the rails.

3. The enclosure of claim 1 further comprising:
   mounting rails carried on the divider wall and including apertures alignable with apertures in mounting flanges on the connector means; and
   the support means in the rear cabinet disposing the mounting flanges on the electrical devices substantially parallel to the mounting flanges on the connector means in the front cabinet.

4. The enclosure of claim 1 further comprising:

the divider wall dividing the front cabinet into first and second, interior compartments; and the door including first and second doors, each separately pivotally mounted on the front enclosure for separably allowing access to the first and second chambers in the front enclosure portion.

5. The enclosure of claim I further comprising:

separate first and second doors pivotally carried on the opposed sidewalls of the rear cabinet allowing separate access to an internal compartment amber formed in the rear cabinet.

6. The enclosure of claim 1 further comprising:

temperature control means communicating with the rear cabinet for controlling the internal temperature of the rear cabinet.

7. The enclosure of claim 6 wherein the temperature control means comprises:

heat removal means for removing heat from the interior of the rear cabinet.

8. The enclosure of claim 6 wherein the temperature control means is mounted on the bottom wall of the rear enclosure portion.

9. The enclosure of claim 5 further comprising:

temperature control means communicating with the rear cabinet for removing heat from the interior of the rear cabinet, the temperature control means mounted on one of the first and second doors on the cabinet.

10. The enclosure of claim 4 further comprising:

separate first and second doors pivotally carried on the opposed sidewalls of the rear cabinet allowing separate access to an internal compartment chamber formed in the rear cabinet.

11. The enclosure of claim 10 further comprising:

temperature control means communicating with the rear cabinet for controlling the internal temperature of the rear cabinet.

12. The enclosure of claim 11 wherein the temperature control means comprises:

heat removal means for removing heat from the interior of the rear cabinet.

13. The enclosure of claim 11 wherein the temperature control means is mounted on the bottom wall of the rear enclosure portion.

14. The enclosure of claim 10 further comprising:

temperature control means communicating with the rear cabinet for removing heat from the interior of the rear cabinet, the temperature control means mounted on one of the first and second doors on the cabinet.

\* \* \* \* \*